(12) United States Patent
Zaiter

(10) Patent No.: US 7,488,426 B1
(45) Date of Patent: Feb. 10, 2009

(54) SCALABLE IMMERSED-FILTRATION METHOD AND APPARATUS

(76) Inventor: Sohail Zaiter, 96 Old Colony Ave., Unit 553, East Taunton, MA (US) 02718

( * ) Notice: Subject to any disclaimer, the term of this patent is extended or adjusted under 35 U.S.C. 154(b) by 0 days.

(21) Appl. No.: 12/009,946

(22) Filed: Jan. 23, 2008

(51) Int. Cl.
*B01D 37/00* (2006.01)

(52) U.S. Cl. ............... 210/767; 210/323.1; 210/323.2; 210/345

(58) Field of Classification Search ............... None
See application file for complete search history.

(56) References Cited

U.S. PATENT DOCUMENTS 3,987,572 A * 10/1976 Bieser et al. ............... 43/4.5
4,145,928 A * 3/1979 Jinks et al. ............... 73/863.24
5,580,454 A * 12/1996 Zaiter ............... 210/323.2

* cited by examiner

*Primary Examiner*—Robert James Popovics
(74) *Attorney, Agent, or Firm*—Seyfarth Shaw LLP; Brian L. Michaelis

(57) ABSTRACT

A method and apparatus for filtering a large volume fluid intake system using a modular immersed-filtration array that can be easily scaled for use in a wide variety of immersion filtering applications. The immersed-filtration array is composed of a plurality of individual filtration modules. Each filtration module has a mating end that allows the module to be coupled with a base unit or plenum via a common interface port located on the base unit. The array can be scaled in a plurality of ways.

4 Claims, 14 Drawing Sheets

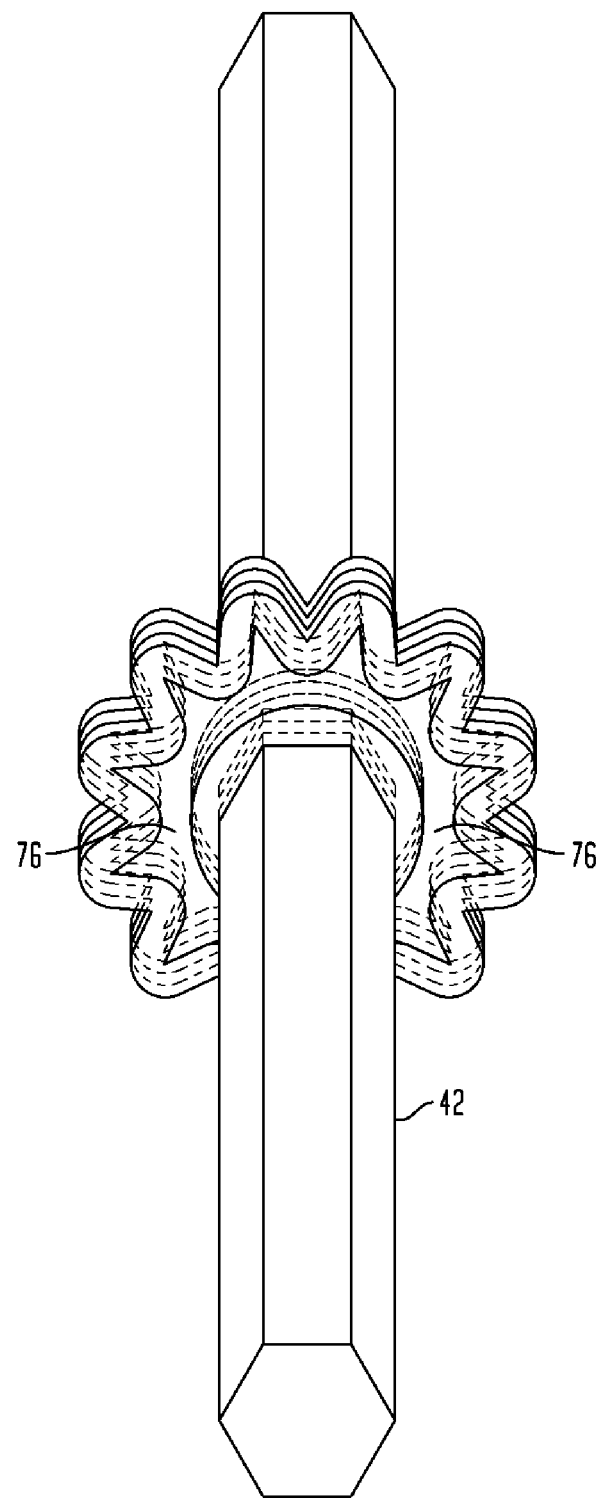

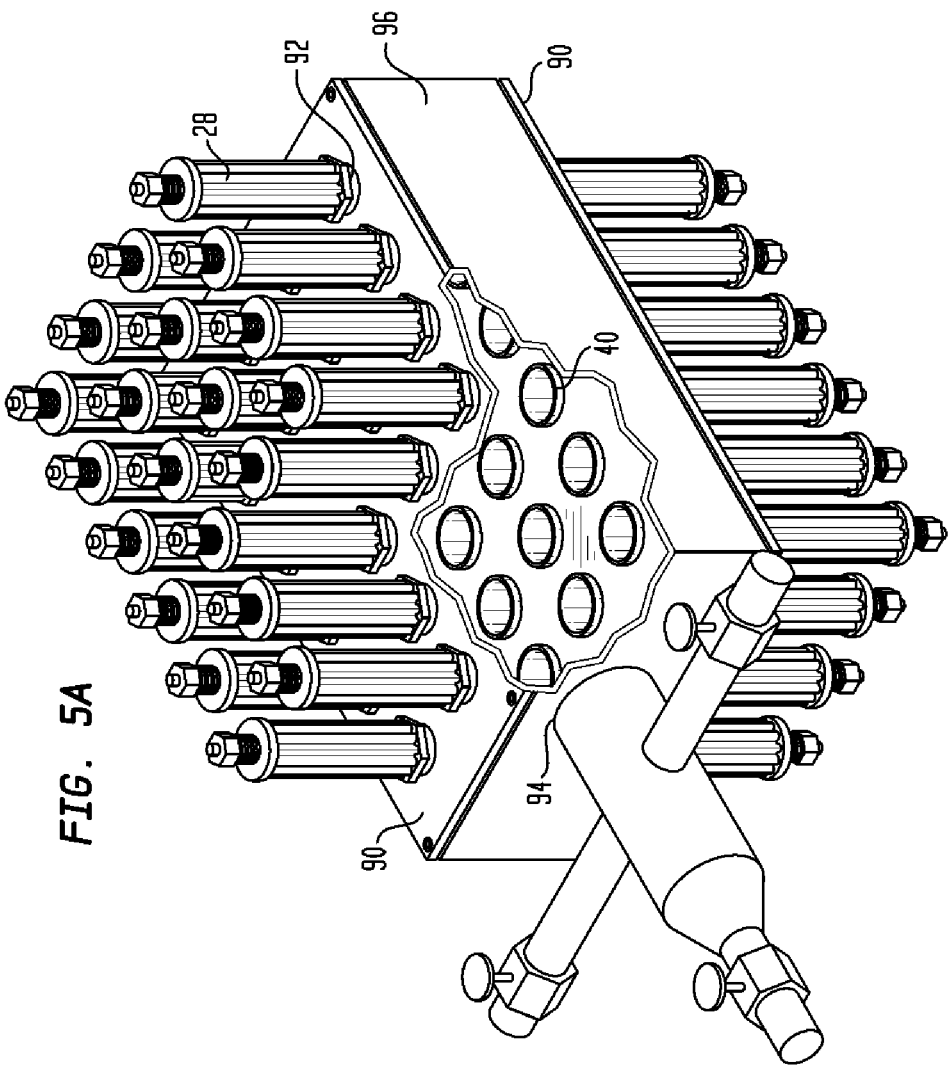

US 7,488,426 B1

SCALABLE IMMERSED-FILTRATION METHOD AND APPARATUS

FIELD OF THE INVENTION

The present invention relates to filtration systems, and more particularly to filtration systems at a large volume of fluid intake.

BACKGROUND OF THE INVENTION

Large volume fluid intake systems are used for generating hydroelectric power, providing cooling water for manufacturing and power generation plants, providing irrigation and potable water supplies, and providing source water for desalinization plants. In the U.S. alone, these systems take in more than 200 billion gallons of fluid per day. Unfortunately, according to U.S. Environmental Protection Agency (EPA) estimates, these fluid intake systems remove billions of aquatic organisms from the water bodies in which they are used, including fish, crustaceans, shellfish, sea turtles, marine mammals, as well as a plethora of other aquatic life forms.

Eggs and larvae of fish (commonly referred to as ichthyoplankton) are particularly sensitive to large volume fluid intake systems because they have little or no swimming ability. Ichthyoplankton range in size from about 0.5 mm to greater than 1 mm in diameter, and normally reside in the upper 200 meters of the water column, where they drift passively in the prevailing currents.

Fluid intake systems negatively impact aquatic life in two major ways: entrainment and impingement. Entrainment is the circumstance where an aquatic organism is drawn into the intake system and subjected to the physical, mechanical, chemical, and thermal forces particular to the design and function of the fluid manipulation system in question. Impingement describes the circumstance where an aquatic organism is trapped against an; upstream physical barrier by the force of fluid flow entering the intake system, and usually occurs in situations where the intake system is screened. Most large volume fluid intake systems are screened to prevent entrainment of debris.

Mortality rates of ichthyoplankton that are either entrained or impinged is high, and may approach 100%. To minimize the impact of large volume fluid intake systems on aquatic ecosystems, Section 316(b) of the Clean Water Act mandates that large volume fluid intake systems, such as the water intake systems used in cooling power plants, reduce impingement levels by 80-95% and entrainment levels by 60-90%. EPA estimates suggest that Section 316(b) compliance will result in benefits to recreational and commercial fishing industries in excess of $100 million annually. Additionally, Section 316(b) compliance is likely to have a beneficial, although difficult to quantify, environmental effect by creating healthier and more robust aquatic ecosystems.

Rates of entrainment and impingement are affected by many factors. For example, both entrainment and impingement are affected by the pore size of the apparatus used to screen the intake system. There is a linear relationship between entrainment and pore size (i.e. entrainment rates increase as filter pore size increases), while there is an inverse relationship between impingement rates and pore size (i.e. impingement rates increase as filter pore size decreases).

Entrainment and impingement rates are also affected by several other factors including, but not limited to, the velocity of the fluid intake system ($V_i$) and the velocity of the source water body ($V_w$) that serves the fluid intake system. Under most circumstances, $V_i$ has a constant value within the fluid intake system that is determined either by gravity or a pump. However, at the point of fluid intake, $V_i$ interacts with the source water body in a complex manner whereby the value of $V_i$ decreases with distance (d) from the point of fluid intake. As d increases relative to the point of fluid intake, it can be recognized that d will eventually reach a critical distance ($d_{max}$) where $V_i$ is equal to $V_w$. In other words, an object in the source water body located outside of the $d_{max}$ area is not influenced by the fluid intake system because it is under the control of the velocity of the source water body flow ($V_w$). Generally, $V_w$ will be constant over short time intervals, but may vary significantly over longer periods of time as a result of a variety of environmental factors (for example, tide, weather, rain, season, etc.).

The probability (p) of an object being entrained/impinged by a filter associated with a fluid intake system is related in a complex manner to the interactions between d, $V_i$, and $V_w$. Generally, p is expected to be low if the ratio of $V_w/V_i$ is high. In other words, the likelihood of being entrained/impinged is low if the velocity of the source water body is significantly faster than the velocity of water being drawn into the fluid intake system, because a high ratio of $V_w$ to $V_i$ has the effect of decreasing the value of $d_{max}$ so there is a smaller distance from the point of intake origin at which $V_i$ can exert an effect that is stronger than $V_w$. In this situation, entrainment/impingement is likely to occur only if an object happens to pass very close to the opening of the fluid intake system.

There are few examples of anti-entrainment/impingement solutions in the art. U.S. Pat. No. 6,051,131 and U.S. Patent Application 0227962A1 recite the use of wire screens wrapped around an intake source, or slots in an intake pipe, to attempt to filter aquatic life forms from the intake fluid. Disadvantageously, these systems are prone to clogging, and require frequent and costly upkeep to maintain their intake function. U.S. Pat. No. 7,118,307 recites the use of intake pipes covered in wire screens and buried under a natural bed of sand located below the intake fluid source to provide a two pass screening system. Disadvantageously, this system is labor intensive and costly to install, as well as difficult to maintain.

U.S. Pat. No. 5,580,454 (hereafter the "'454 patent", incorporated by reference herein) discloses a filter cartridge that is backwashable and may provide aspects of a filter element suitable for screening large volume fluid intake systems. However, the filter cartridge of the '454 patent was not heretofore used in such a fluid intake filtering application. On the contrary, the filter cartridge of the '454 patent was designed as an in-line filter for use in high pressure applications; consequently, it has aspects that are not suited for use in screening large volume fluid intake systems. For example, the filter cartridge of the '454 patent was designed for use within a sealed, pressurized vessel (FIG. 1A, 22), and has mounting flanges specific for this type of in-line application (FIG. 1, 24). Additionally, because of the high pressures involved in this filtering application (and correspondingly high values of $V_i$), the mounting flanges contain narrow diameter fluid connectors for moving the filtrate between the two chambers of the vessel (FIG. 1, 26), and such connectors would not be suitable for an application using lower values of $V_i$ (e.g. cooling water intake for a power plant).

SUMMARY OF THE INVENTION

The present invention provides a method and apparatus for filtering a large volume fluid intake system using a modular immersion filtration array that can be easily scaled for use in a wide variety of immersion filtering applications. The immersed-filtration array is composed of a plurality of individual filtration modules. Each filtration module has a mating end that allows the module to be coupled with a base unit or plenum via a common interface port located on the base unit. The array can be scaled in a plurality of ways. For example, the number of common interface ports on the plenum or base unit can be increased to allow a corresponding increase in the number of filtration modules. In another embodiment, the number and configuration of base units can be increased to allow increases in flow-through and filtration capacity that varies with the number of filtration modules per plenum.

The filtration module comprises a plurality of filter elements (such as, for example, those described in the '454 patent) that are assembled onto a stacking core to create a filter stack. Generally, each filter element comprises an outer filtration portion connected, via a plurality of tabs, to a mounting portion having an inner cavity and an outer arcuate surface, where the plurality of tabs, the outer arcuate surface of the mounting portion, and the inner surface of the filtration portion are configured to form a plurality of integral fluid channels.

The filter stack is sandwiched between a first end and a second end of the stacking core. The first end comprises an outer circumference and bottom side which form a mating surface to couple the filtration module to a common interface port of a plenum. An abutment side of the first end forms a base against which the filter stack abuts. The interior of the first end is hollow and the top side contains a plurality of cavities. In the column of stacked filter elements disposed on the stacking core, the plurality of integral fluid channels accommodate the flow of filtrate from the filter stack, through the cavities in the top side of the first end of the stacking core, and out the bottom side of the first end of the stacking core, thereby allowing the filtrate to traverse the plenum to which the filtration module is attached and moving the filtrate into the general fluid intake system. The second end of the stacking core is affixed with an adjustable compression means that provides counter-pressure to hold the filter stack against the top side of the first end of the stacking core.

The adjustable compression means allows the filter stack to be backwashed by reversing the flow of fluid through the filter stack. The pressure generated by this counter flow reduces the pressure applied to the filter stack by the compression means, thereby allowing the filter elements within the stack to separate as fluid flows from the interior to the exterior of the stack, removing any impinged material from the outside of the stack in the process. The stacking core is rigid enough to withstand high radial forces and the integral passages reduce the potential for preferential flow of backwash fluid. Avoidance of preferential flow is a significant feature that ensures uniformity of flow of backwash fluid throughout the filter elements in the stack, which ensures even cleaning of the individual filter elements in the filter stack.

An advantage of the filtration module of the present invention is its modular design, which allows it to be incorporated into any conceivable two or three dimensional configuration that could be designed for a fluid intake system. Additionally, this modular design allows the present invention to be easily scaled up or down to suit essentially any large volume fluid processing system. Yet another advantage of the modular, scalable nature of the present invention is that it can be easily incorporated into a wide variety of different filtration array architectures to accommodate almost any imaginable physical location of a fluid intake system.

Another advantage of the filtration module of the present invention is a high ratio of surface area to three dimensional volume, which allows a robust level of fluid processing capacity at a low velocity of fluid intake ($V_i$). This is advantageous in the context of an immersed-filtration array incorporating the present invention because it reduces ichthyoplankton entrainment/impingement rates by maintaining a favorable ratio of $V_w$ to $V_i$, thereby reducing the probability of ichthyoplankton proximity to the point of intake.

Advantageously, the filtration module of the present invention virtually eliminates ichthyoplankton entrainment rates because the filter element grooves are sized in the micron range, while the lower limit of ichthyoplankton diameter is about 0.5 mm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features and advantages of the present invention will be better understood when reading the following detailed description, taken together with the following drawings in which:

FIG. 4A is a plan view of a filtration element according to the prior art;

FIGS. 5A-5E, FIGS. 6A-6D, FIGS. 7A-7B and FIGS. 8A-8D are views of a three dimensional immersed-filtration array according to the invention.

DETAILED DESCRIPTION

Figure 1A:
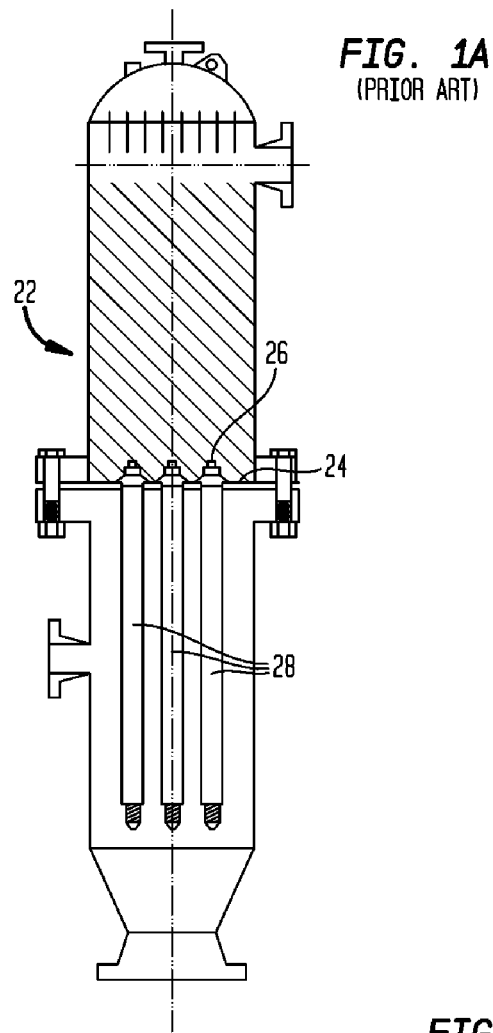
FIG. 1A is an elevation view of a filter vessel including a plurality of filter cartridges according to the prior art.
Figure 1B:
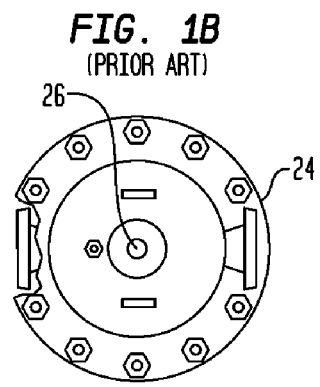
FIG. 1B is a top view of a perforated filter plate supporting filter cartridges in the prior art filter vessel of FIG. 1A.
Figure 1C:
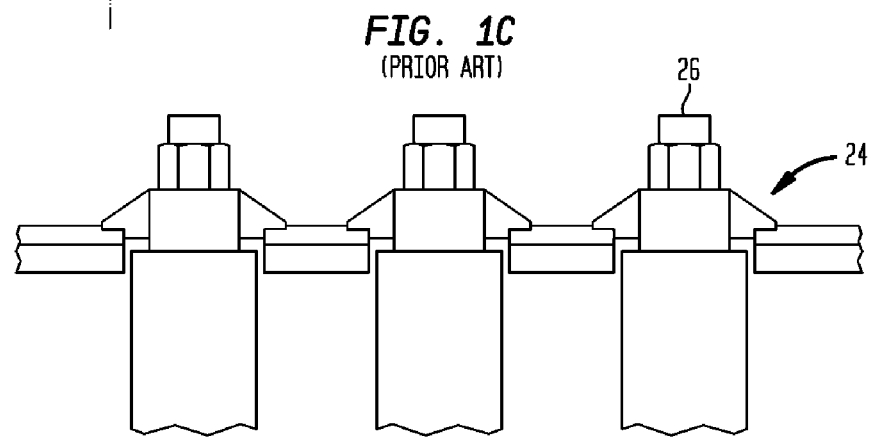
FIG. 1C is a side section view of the perforated filter plate of FIG. 1B showing a tube clamp fastening implementation according to the prior art.
Figure 2A:
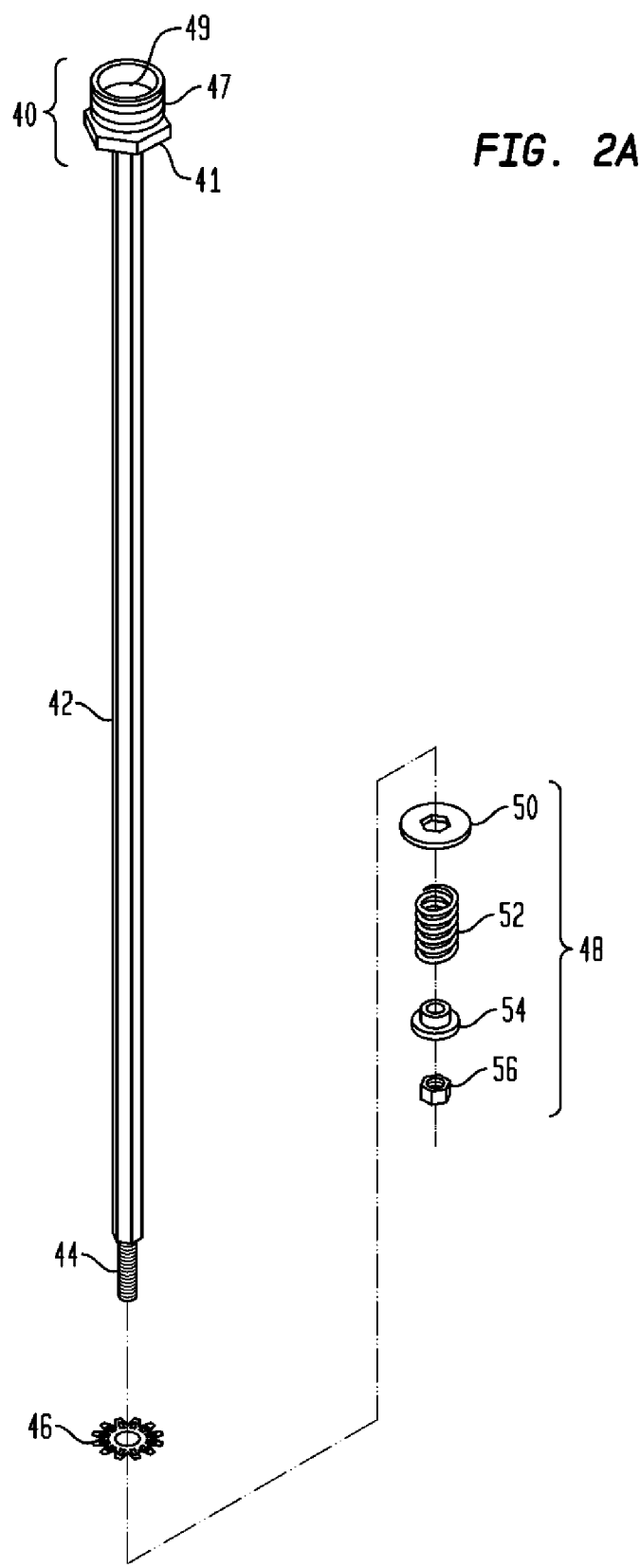
FIG. 2A is an exploded view of an exemplary filtration module including a stacking core, a single filter element, and a compression means according to the invention.
Figure 2B:
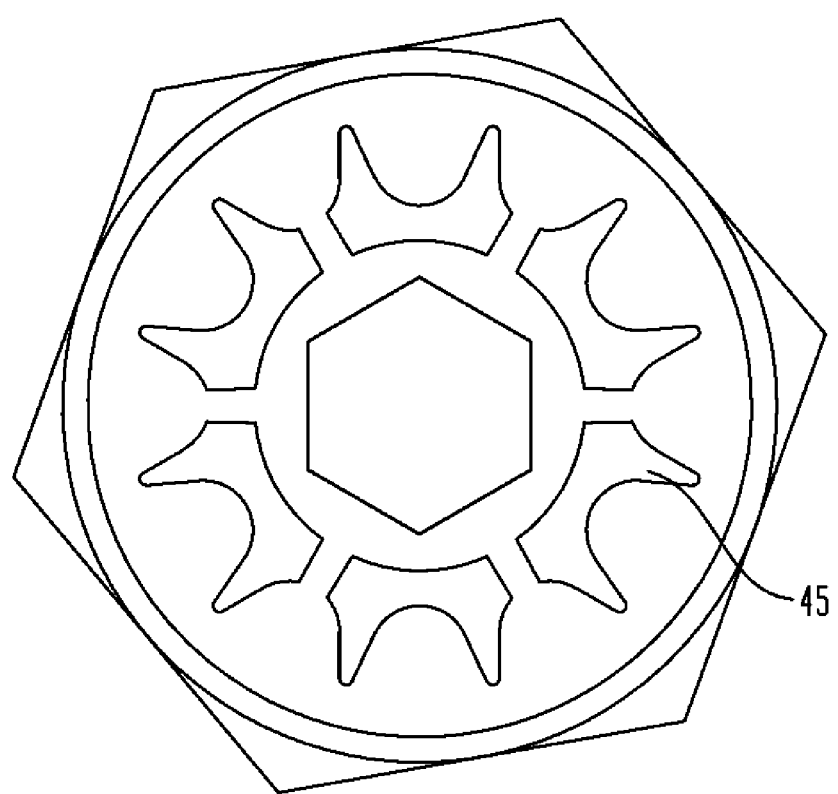
FIG. 2B is a perspective view of the mating end of the stacking core depicting the mating surface and the conduit for filtrate flow of the filtration module of FIG. 2A.
Figure 3:
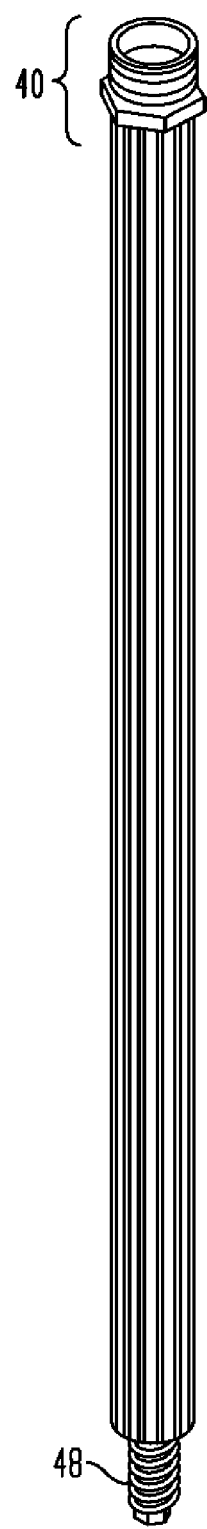
FIG. 3 is a side view of a filtration module depicting the assembled filter stack affixed to the stacking core via the compression means according to the invention.

As illustrated in FIGS. 2-5, an immersed-filtration apparatus according to the invention is comprised of at least one filtration module, which in turn is comprised of a plurality of stacked filter elements. As generally illustrated in FIG. 2A, the filtration module is comprised of a geometric stacking core (42), which holds a plurality of filter elements (46) to form the filter stack (FIG. 3, 62). The stacking core (FIG. 4A, 42) has a geometric shape that corresponds to the inner cavity of the filter element (FIG. 4B, 70), a mating end (FIG. 2A, 40) comprising a mating surface (FIG. 2A, 47) and a conduit for filtrate outflow (FIG. 2A, 49), and a second end comprising an attachment means (44) for affixing a compression means (48).

Figure 4B:
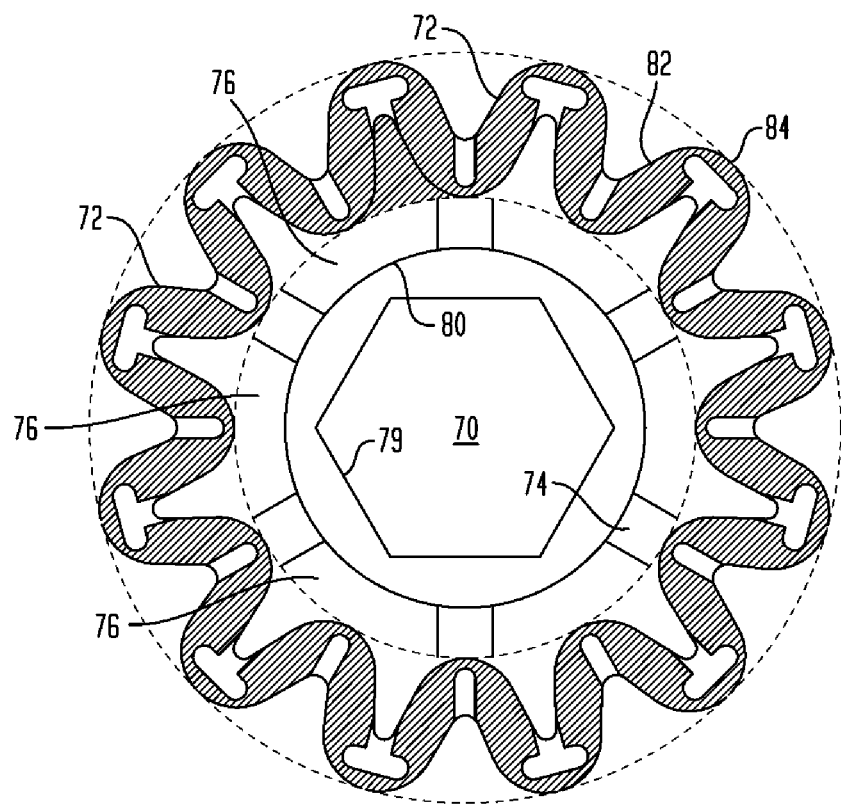
FIG. 4B is a perspective view of a partial stack of filter elements according to the prior art.
Figure 5B:
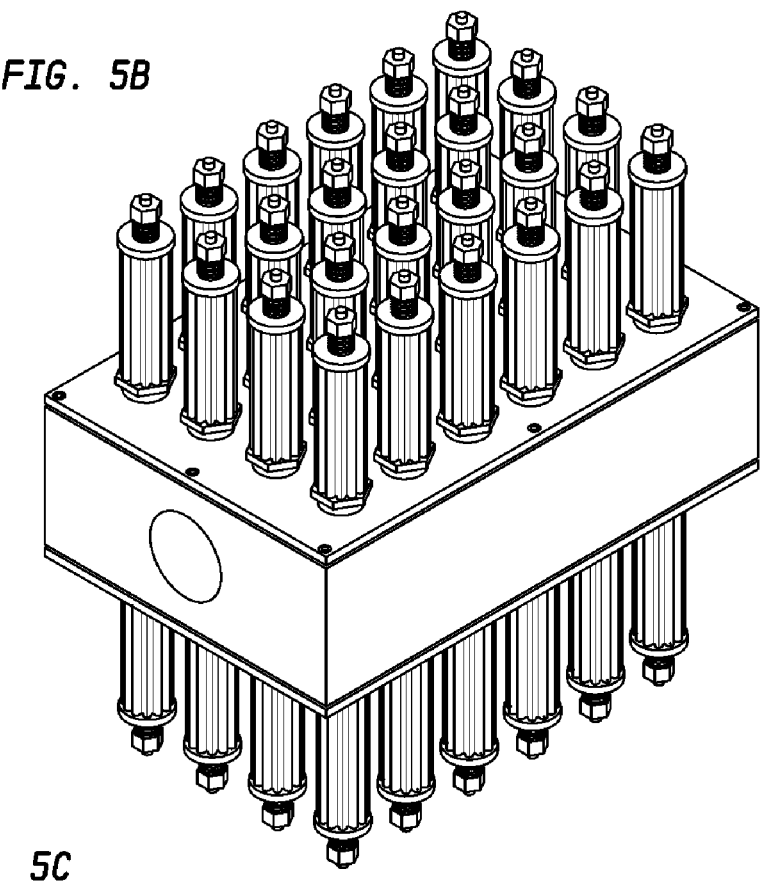
Figure 5C:
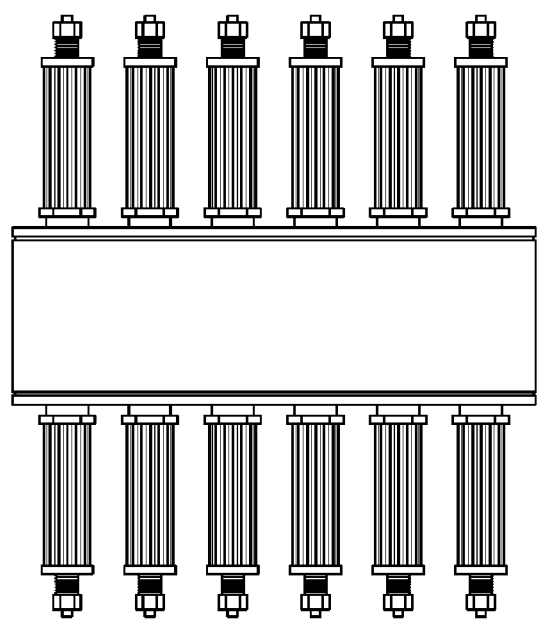
Figure 5D:
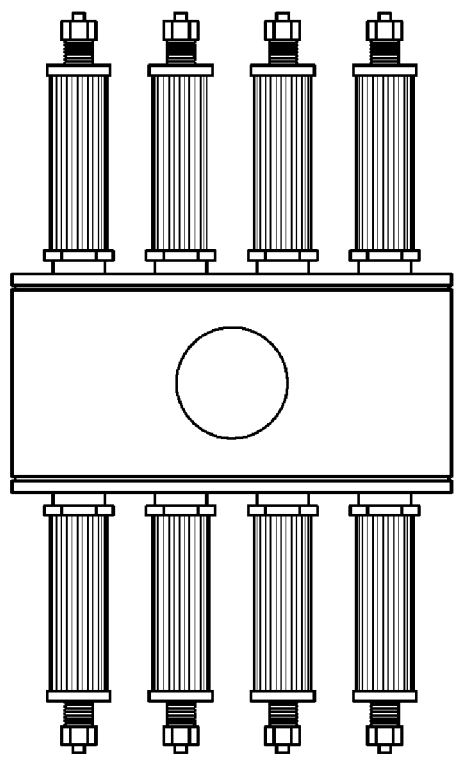
Figure 5E:
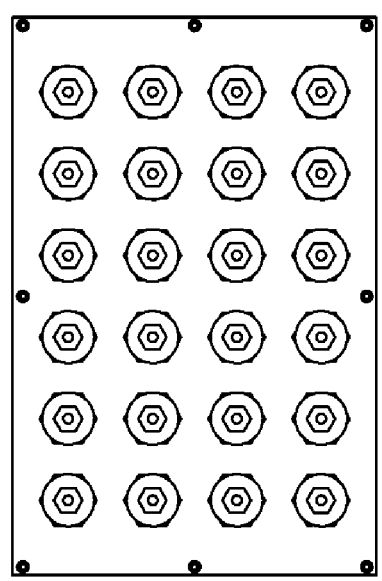
Figure 6A:
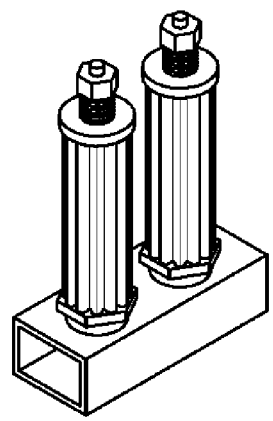
Figure 6B:
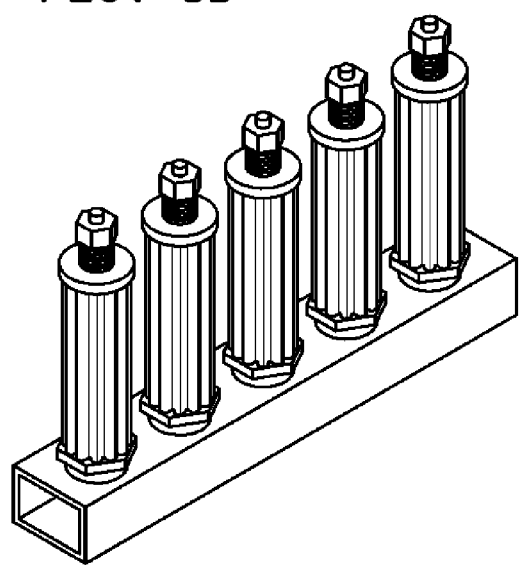
Figure 6C:
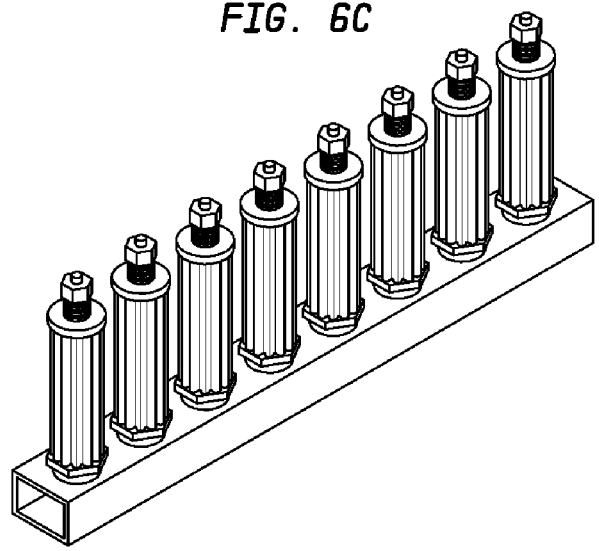
Figure 6D:
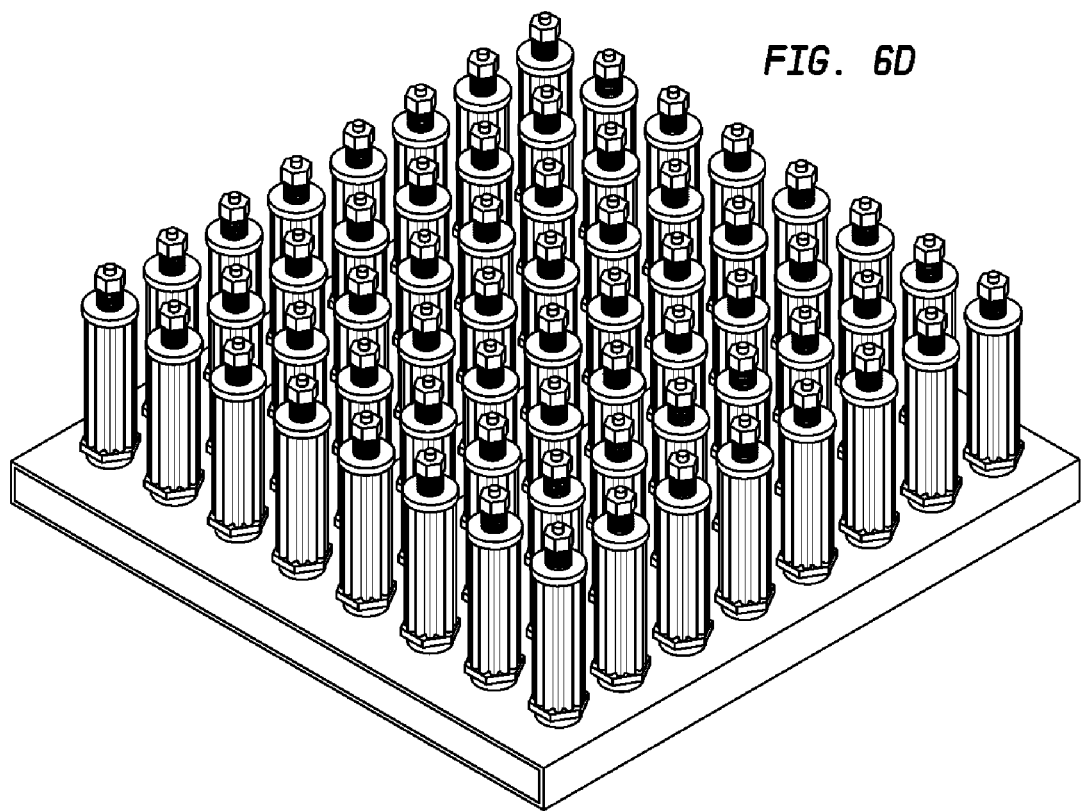
Figure 7A:
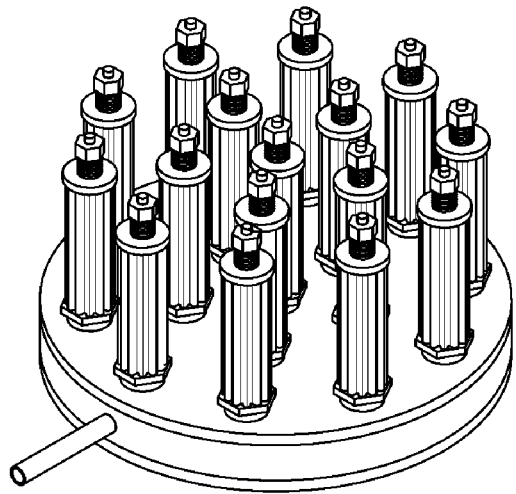
Figure 7B:
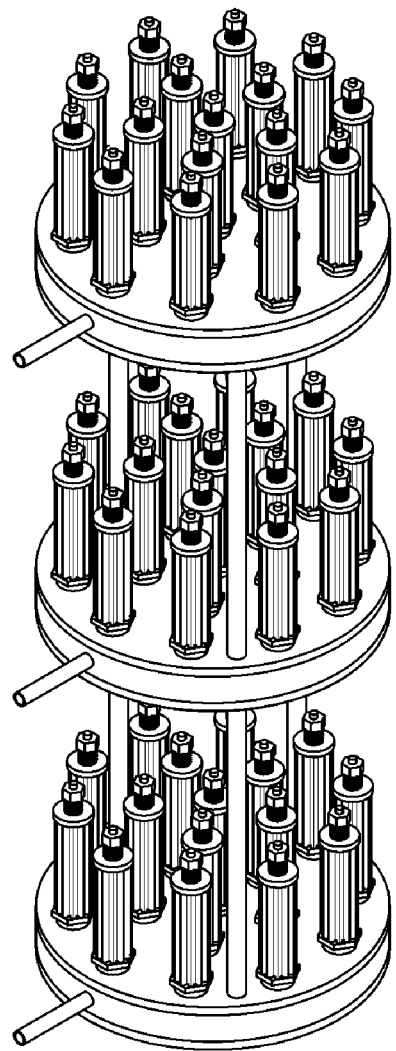
Figure 8A:
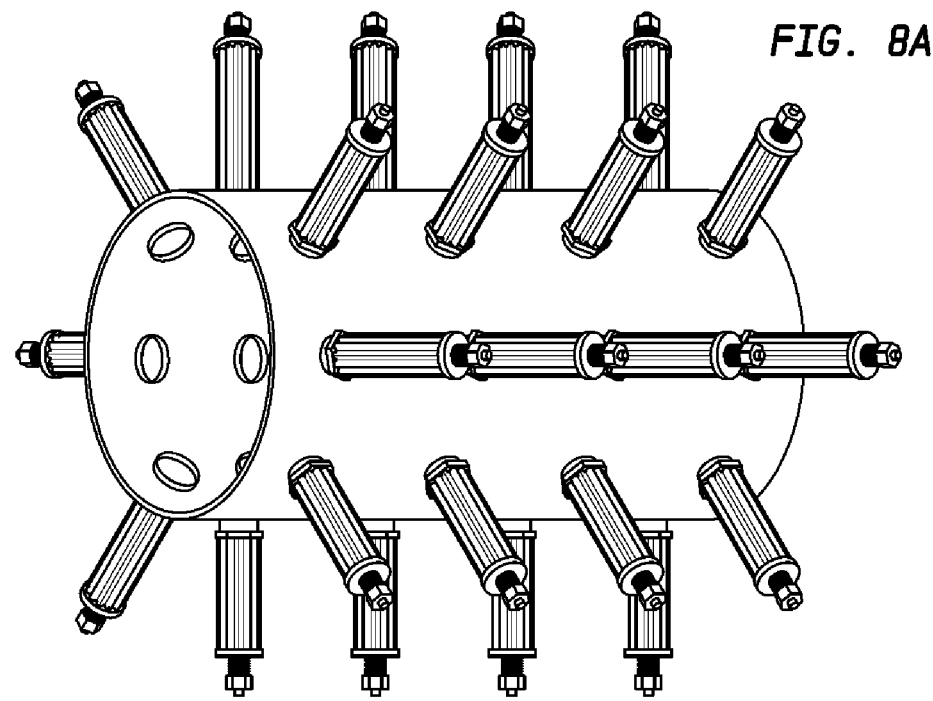
Figure 8B:
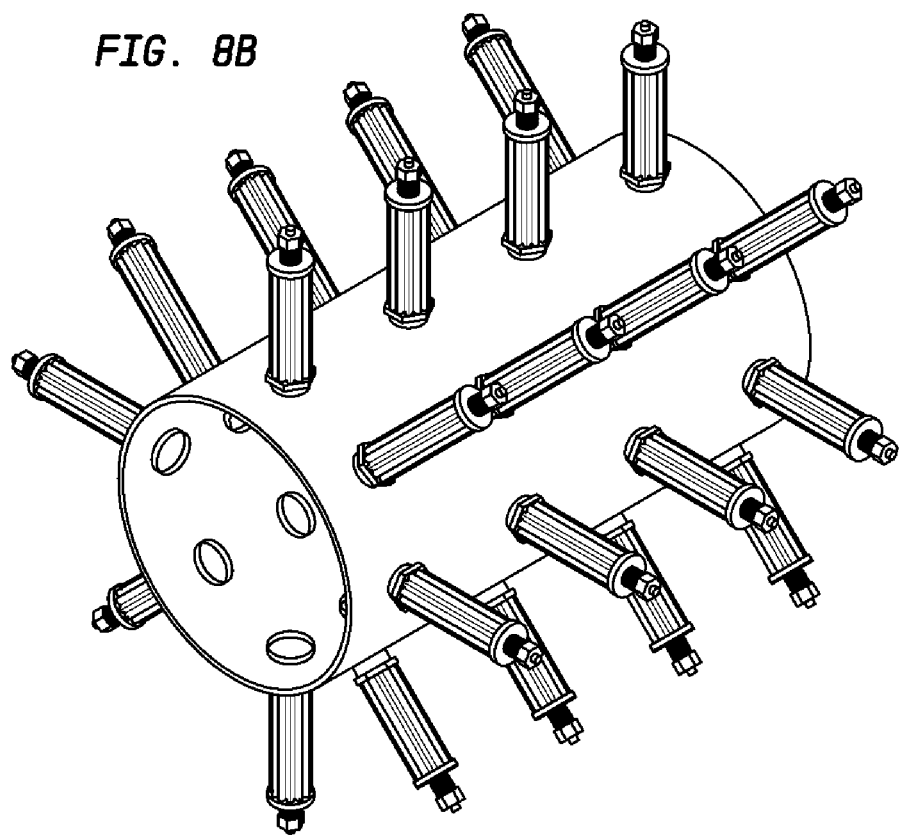
Figure 8C:
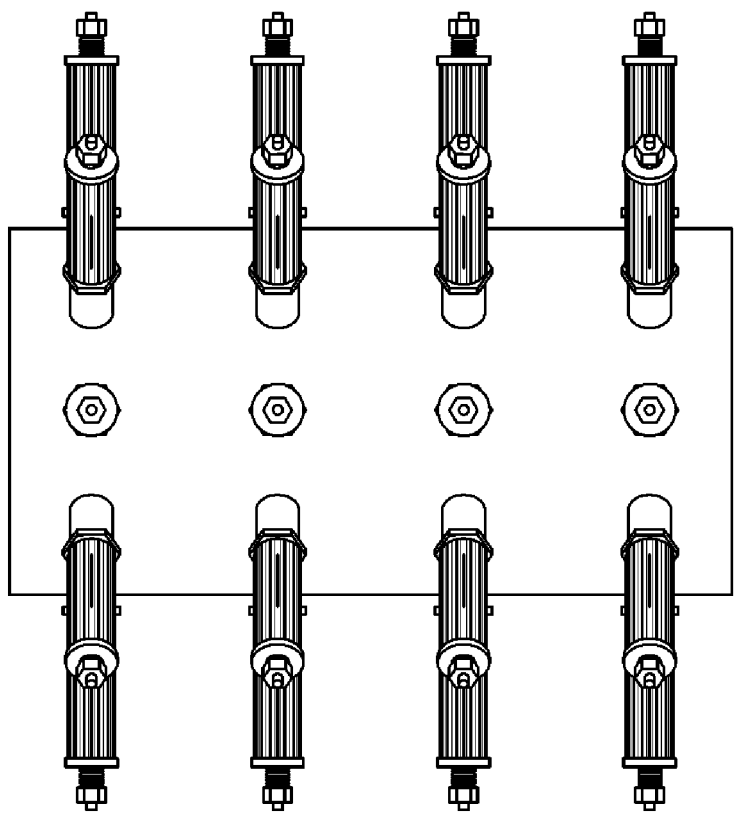
Figure 8D:
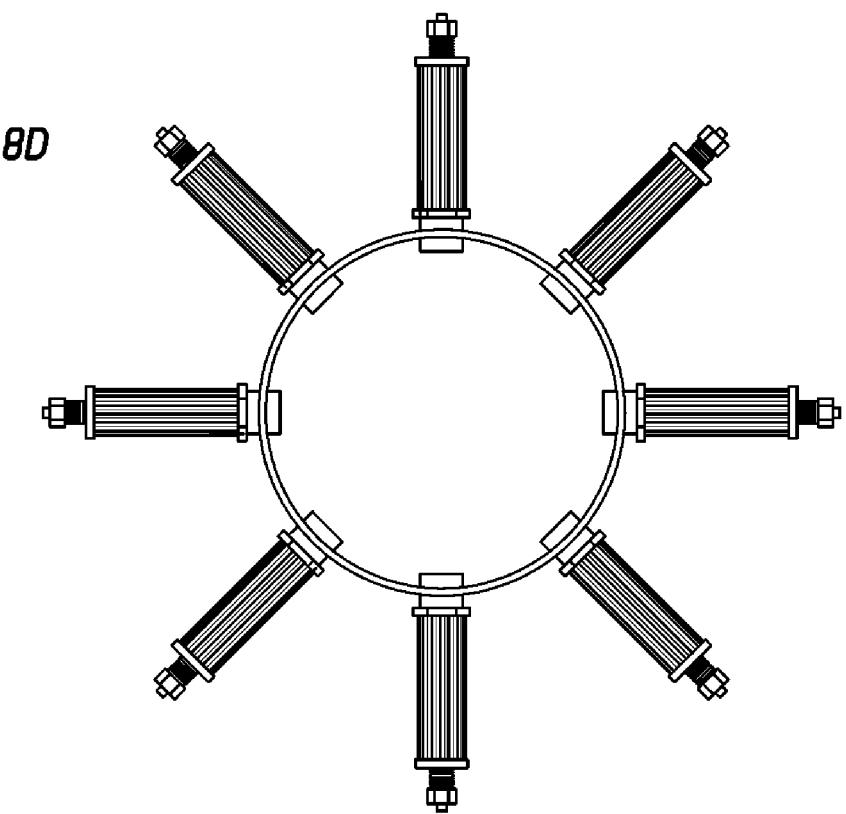

As depicted in FIG. 4B, the filter elements are 1½" wide and generally constructed and configured as described in the '454 patent, consisting of an outer filtration portion (72) and an inner geometrically shaped cavity (70) connected to one another via a plurality of tabs (74). The inner geometrically shaped cavity contains both an inner (79) and outer (80) side, and functions to allow the filter element to fit onto the central shaft of the stacking core in a manner that prevents rotation of the element around the shaft (i.e. it resides in a fixed two dimensional plane once positioned on the stacking core). The plurality of interstices (76) that reside between the outer filtration portion (72), the outer side of the inner geometric cavity (80), and the tabs (74) form a plurality of integral fluid connectors (FIG. 4A, 76) once the individual filter elements are combined to form the filter stack (FIG. 3, 62).

As shown in FIG. 4B, the outer filtration portion (72) is formed by twelve arcs (84) that contain a plurality of grooves (82) that span the width of the outer filtration portion (72). The twelve arcs (84) function to increase the surface area of the outer filtration portion (72), which in turn increases the total number of grooves (82) permeating the perimeter of the outer filtration portion (72). The grooves (82) possess about the same three dimensional characteristics as described in the '454 patent, but in the exemplary embodiment are sized at about 40 microns.

In the exemplary embodiment, the stacking core is 7¾" tall and consists of a single piece of injection molded glass-filled polypropylene. However, one could easily construct the stacking core with different dimensions, or from different thermoplastic compositions, to suit different filtration applications. As illustrated in FIG. 2A, the mating end (40) of the stacking core is wider than the stacking core (42). The top side (41) of the mating end serves as the base against which the filter stack abuts, and also contains a plurality of cavities (FIG. 2B, 45) that align with the integral fluid connectors of the filter stack (FIG. 4A, 76). The outer circumference of the first end located below the top side (41) functions as a mating surface (47), and while in this exemplary embodiment the mating surface is a 1¼" National Pipe Thread (NPT) fitting, one skilled in the art can appreciate the potential for any of a variety of additional or alternative mating means. The region of the mating end interior to the mating surface in the illustrative embodiment forms a conduit for filtrate flow (49) through the plurality of cavities present in the top side of the first end (FIG. 2B, 45). In combination, the conduit (49) and the plurality of cavities (45) form a passageway for moving filtrate from the filter stack through the first end of the stacking core.

As generally illustrated in FIG. 2A, the second end of the stacking core is threaded (44) to allow attachment of a compression means (48). While the second end is threaded in this exemplary embodiment, it should be appreciated that a plurality of additional means for attaching the compression means could also be used. Generally, the compression means comprises a compression plate (50), a compression spring (52), an anti-torsion washer (54), and an end piece (56). The compression plate (50) sits on top of the filter stack and functions to seal the top end of the filter stack; additionally, it also provides a contact surface for the bottom end of the compression spring (52), which is located between the compression plate (50) and the anti-torsion washer (54). In turn, the anti-torsion washer is located between the compression spring (52) and the end-piece (56). The compression means functions to apply adjustable pressure to the compression plate, which subsequently compresses the filter stack against the top side of the first end. While this represents an exemplary embodiment, it should be appreciated that various other means for providing adjustable pressure against the filter stack could also be implemented according to the present invention.

An embodiment of an immersion filtration array according to the invention, is illustrated in FIGS. 5A-5E, and comprises a plurality of filtration modules (28) affixed to a base (90) via a corresponding plurality of common interface ports (92). In this exemplary embodiment, the immersion filtration array is a three-dimensional box (96) forming a plenum or base unit with a filtration module containing base (90) affixed to at least one surface of the box and a second filtration module containing base affixed to the bottom surface of the box (96). The common interface ports (92) are threaded to match the threaded mating end of the filtration module (40). Additionally, the box (96) also contains an attachment means (94) for connecting it to a fluid intake system.

The immersion filtration array according to the invention by its configuration is scalable. For example, the base plate (90) can be enlarged to contain more common interface ports (92), thereby resulting in a corresponding increase in the number of filtration modules associated with the base, as well as a proportional increase in the filtrate through-put capacity. Alternatively, the system can be scaled by increasing the number of filtration module/base assemblies associated with the fluid intake system, thereby resulting in a linear doubling of the filtrate through-put capacity. While the exemplary embodiment described herein depicts the immersion filtration array as a three dimensional box, it should be noted that it could also be a sphere or polyhedra. Other geometries and configurations of the immersion filter according to the invention can be implemented, such as those illustrated in FIGS. 6A-6D, FIGS. 7A-7B and FIGS. 8A-8D.

The modular nature of the immersion filtration array according to the invention provides for a high filtrate through-put capacity at a relatively low velocity of fluid intake ($V_i$). In the exemplary embodiment, $V_i$ is equal to about 0.2 feet per second and generates a filtrate through-put rate of about 9.25 gallons per minute per filtration module. Even if the immersed-filtration array is implemented in a source water body that has a relatively low main water velocity ($V_w$) of 1.1 feet per second, the array can still achieve an entrainment/impingement reducing ratio of $V_w$ to $V_i$ that is about 5.5. Given this, the immersed-filtration array can reduce entrainment/impingement rates by maintaining an optimal ratio of $V_w$ to $V_i$ while simultaneously maintaining an acceptable level of filtrate through-put capacity for a large volume fluid intake system.

Although the invention has been shown and described with respect to an exemplary embodiment thereof, it will be appreciated that the foregoing and various other changes, additions, and omissions in the form and detail thereof may be made therein without departing from the spirit and scope of the invention.

What is claimed is:

1. A method of reducing entrainment and impingement of fluid-borne ichthyoplankton, the method comprising the steps of:
    providing an immersed filtration array;
    filtering a fluid containing said ichthyoplankton through a plurality of filtration modules of said immersed filtration array, wherein said filtration modules contain filter elements having a groove size of about 10 times to about 1,000 times less than the average lower diameter limit of ichthyoplankton, and;
    filtering at a $V_i$ such that the ratio of $V_w$ to $V_i$ is between about 2 and 25, to reduce entrainment and impingement of said ichthyoplankton.

2. The method according to claim 1 wherein said filter element pore size is about 40 microns.

3. The method according to claim 1 wherein the ratio of $V_w$ to $V_i$ is about 5.

4. The method according to claim 1 wherein $V_i$ is about 0.2 cubic feet per second.

* * * * *